United States Patent

Zimmermann et al.

[11] Patent Number: 5,951,750
[45] Date of Patent: Sep. 14, 1999

[54] ANTI-YELLOWING POLYOLEFIN COMPOSITIONS CONTAINING PEARLESCENT PIGMENT TO PREVENT YELLOWING AND METHOD THEREFORE

[75] Inventors: Curtis J. Zimmermann, Cold Spring, N.Y.; J. Mike Hanckel, Summerville, S.C.

[73] Assignee: Engelhard Corporation, Iselin, N.J.

[21] Appl. No.: 08/878,538

[22] Filed: Jun. 19, 1997

[51] Int. Cl.⁶ .............................. C04B 14/20; C09C 1/40; C08F 10/00
[52] U.S. Cl. ..................... 106/417; 106/419; 106/430; 106/436; 106/438; 106/449; 523/200; 523/307; 524/323; 524/351; 524/449; 524/543
[58] Field of Search .................................. 106/417, 419, 106/436, 438, 449, 430; 523/200, 307; 524/323, 351, 449, 543

[56] References Cited

U.S. PATENT DOCUMENTS

| | | | |
|---|---|---|---|
| 3,087,828 | 4/1963 | Linton | 106/417 |
| 3,711,308 | 1/1973 | Brand et al. | 106/417 |
| 4,209,170 | 6/1980 | Weber | 524/497 |
| 4,357,170 | 11/1982 | Brand | 106/448 |
| 4,435,220 | 3/1984 | Watanabe et al. | 106/415 |
| 4,509,988 | 4/1985 | Bernhard | 106/418 |
| 4,828,623 | 5/1989 | Nitta et al. | 106/450 |
| 4,999,055 | 3/1991 | Holtzen et al. | 106/436 |
| 5,022,923 | 6/1991 | Rau et al. | 106/417 |
| 5,116,664 | 5/1992 | Kimura et al. | 428/216 |
| 5,223,034 | 6/1993 | Nitta et al. | 106/417 |
| 5,271,770 | 12/1993 | Noguchi et al. | 106/415 |
| 5,376,698 | 12/1994 | Sipsas et al. | 523/200 |
| 5,423,912 | 6/1995 | Sullivan et al. | 106/417 |
| 5,456,749 | 10/1995 | Iwasa et al. | 106/417 |
| 5,565,025 | 10/1996 | Schraml-Marth | 106/417 |
| 5,573,584 | 11/1996 | Ostertag et al. | 106/417 |
| 5,626,661 | 5/1997 | Schmid et al. | 106/417 |
| 5,662,738 | 9/1997 | Schmid et al. | 106/417 |

FOREIGN PATENT DOCUMENTS

| | | | |
|---|---|---|---|
| 327739 | 8/1989 | European Pat. Off. | 106/417 |
| 644242A2 | 9/1994 | European Pat. Off. . | |
| 649886 | 4/1995 | European Pat. Off. | 106/417 |
| 2628353 | 12/1977 | Germany | 106/417 |
| 94/01498 | 1/1994 | WIPO | 106/417 |
| WO94/01498 | 1/1994 | WIPO . | |

OTHER PUBLICATIONS

Chemical Abstract No. 122:162602, abstract of Japanese Patent Specification No. 06–256667, Sep. 1994.
WPIDS Abstract No. 88–180159, abstract of Japanese Patent Specification No. 63–118373, May 1988.

*Primary Examiner*—Anthony Green
*Attorney, Agent, or Firm*—Ostrolenk, Faber, Gerb & Soffen, LLP

[57] ABSTRACT

Antioxidant-containing polyolefin compositions are provided including titanium dioxide-coated mica particles having an overcoating calcined thereon to prevent yellowing of the compositions. Reduced photo-darkening and improved densification of the pigment can also be achieved.

32 Claims, No Drawings

ANTI-YELLOWING POLYOLEFIN COMPOSITIONS CONTAINING PEARLESCENT PIGMENT TO PREVENT YELLOWING AND METHOD THEREFORE

BACKGROUND OF THE INVENTION

1. Field of the Invention

The present invention relates to anti-oxidant containing polyolefin compositions resistant to yellowing and including a pearlescent pigment.

2. Description of the Prior Art

Many pearlescent or nacreous pigments are based on micaceous substrates which have been coated with a metal oxide layer. As a result of reflection and refraction of light, these pigments exhibit pearl-like luster and depending on the thickness of the metal oxide layer, they can also exhibit interference color effects.

Commercially, the pearlescent pigments encountered most often are the titanium dioxide-coated mica pearlescent pigments. However, such pigments can cause yellowing of anti-oxidant containing polyolefin compositions in which they are contained.

U.S. Pat. No. 4,209,430 relates to a process for suppressing yellowing in thermoplastic polyolefins containing a phenolic anti-oxidant and $TiO_2$ pigment by adding a phosphorylated polyene either directly to the polyolefin or as a coating on the pigment.

U.S. Pat. No. 4,357,170 reviews various solutions to the problem of yellowing of titanium dioxide pigments in polymeric compositions such as polyethylene in the presence of additives such as phenolic antioxidants.

U.S. Pat. No. 5,376,698 describes anti-oxidant containing polyolefin compositions including titanium dioxide-coated mica particles having a coating of silica and alumina calcined thereon to prevent yellowing of the polyolefin composition.

U.S. Pat. No. 4,435,220 teaches coating platelets with a colored metal oxide or hydroxide, optionally commingled with a colorless oxide or hydroxide, which is improved by including a small amount of an alkaline earth metal in the reagent. The process is stated to provide for transparent colored pigments with improved dispersability, better gloss, clearer color and improved stability to heat and weathering. Improved anti-yellowing properties in the presence of an anti-oxidant is not disclosed.

U.S. Pat. No. 5,271,770 teaches a pigment in which the surfaces of a platelet-like substrate is coated with calcium sulphate and then covered with titanium or zirconium oxide. The resulting pigment is indicated to possess good adhesion and spreadability and has the effect of reflecting ultraviolet rays and infrared rays. No mention is raised about the possibility of using this pigment in a polyolefin composition containing an anti-oxidant.

In addition to the yellowing problem, there is also a problem of photodarkening. This can occur when the pigment is exposed to light, whether in the form of a loose powder or incorporated in a matrix such as an automotive paint, cosmetic formulation, plastic formulation, ink formulation, etc. When photodarkening occurs, the appearance or performance of the pigment, or both, becomes reduced.

There remains a need for an anti-oxidant containing polyolefin composition containing a pearlescent pigment which resists photodarkening and/or yellowing of the polyolefin composition. It is accordingly the object of the present invention to provide such a composition as well as providing a pearlescent pigment for use in such composition and a method of preventing photodarkening and/or yellowing of the anti-oxidant containing polyolefin composition.

These and other objects of the invention will become apparent to those skilled in this art from the following detailed description.

SUMMARY OF THE INVENTION

This invention relates to anti-oxidant and titanium dioxide-coated mica containing polyolefin compositions and, more particularly, to such polyolefin compositions in which the titanium dioxide-coated micaceous pearlescent pigments include a coating of metal compound selected from the group consisting of the oxides and phosphorous compounds of Mg, Ca, Ce, Zn, Y and doped $ZrO_2$ (in which the dopant is Y, Ca or Ce) calcined thereon. The invention also provides a process for preventing or retarding the yellowing and/or photodarkening of a polyolefin composition, which comprises mixing such titanium dioxide coated-mica particles with an antioxidant and a polyolefin. In some instances, a densification of the $TiO_2$ occurs with these metal compound coatings and this improves the appearance of the pigment by enhancing the color purity and reducing the photodarkening and yellowing characteristics of the pigment.

DETAILED DESCRIPTION OF THE INVENTION

Titanium dioxide-coated mica pearlescent pigments are well known in the art. They are generally formed by depositing a hydrous titanium compound on a mica substrate and calcining to produce the titanium dioxide-coated mica pigment. Any of the titanium dioxide-coated mica pigments known heretofore can be used in the practice of the present invention.

The titanium dioxide-coated mica pigments include anatase and rutile forms of titanium dioxide. Both forms can be overcoated according to the present invention to retard the yellowing of the polyolefin compositions in which they are contained. Various particle sizes of the titanium dioxide-coated mica pigments may be overcoated. For example, pigments with an average particle size from $5\mu$ to $50\mu$ as well as particle sizes outside this range can also be treated.

The titanium dioxide-coated mica pigments which can be treated include the white pearl titanium dioxide-coated micas. Also, interference pigments can be used. Interference pigments are pigments in which the thickness of the titanium dioxide layer on the mica causes the film to act as an optical filter, and interference colors are observed. Pigments such as interference yellow, red, blue and green may be used or any intermediate colors.

The titanium dioxide-coated mica pigments also may contain ingredients added thereto to improve the durability characteristics or other properties of the pigments. Thus, the titanium dioxide-coated mica pigments may contain various oxides such as silicon dioxide, iron oxide, zinc oxide, tin oxide, aluminum oxide, chromium oxides and the like.

The titanium dioxide-coated mica pigment is overcoated with a layer of a metal compound which, after calcining, is an oxide or phosphorous compound of magnesium, yttrium, calcium, cerium, zinc or is doped zirconia in which the dopant is yttria, calcium or cerium. Yttria-doped zirconia has previously been used to make ceramic materials. See, e.g., U.S. Pat. No. 4,999,055. Zinc oxide-coated titanium dioxide-coated mica pearlescent pigments are known. See, e.g., U.S. Pat. No. 3,087,828. The phosphorous compound is preferably a phosphate but can be a phosphite or the like.

The coating of the titanium dioxide-coated mica is effected by contacting the titanium dioxide-coated mica pigment with a coating composition which contains the metal compound or a precursor thereof. The coating composition may be in the form of a solution or a slurry. The contact conditions are established so that the metal compound or a precursor of the metal compound is deposited on the titanium dioxide coating of the pearlescent pigment. For example, the pH can be regulated in the coating solution to maintain the metal precursor in a dissolved or dispersed condition and then the pH can be changed in order to deposit hydrous metal on the titanium dioxide surface. A metal compound precursor is a metal compound or complex which is transformed into the oxide or phosphorus compound after being deposited on the titanium dioxide surface and being calcined. For instance, zinc chloride is a precursor of zinc oxide, the combination of zinc chloride and sodium phosphate is a precursor zinc phosphate, cerium sulphate and cerium nitrate are precursors of cerium oxide, etc.

The amount of the coating is preferably sufficient to provide an overcoating on the titanium dioxide-coated mica which contains metal, after calcining, in a quantity of about 0.1% to about 5% by weight, more preferably about 0.2% to about 2.5% by weight, excluding dopant. If too great a concentration of metal is used in the overcoating on the titanium dioxide-coated mica, the luster of the pigment can fall to unacceptable levels. In that event, the concentrations should be reduced. The amount of dopant, expressed as metal, based on the weight of the zirconium oxide is preferably in the range of about 0.1 to 3 percent, most preferably about 0.2 to 2 percent.

All titanium dioxide-coated mica pearlescent pigments have a tendency to photodarken, that is to become somewhat darker in color after being exposed to light. Of all of the metal compounds useful in the present invention, the magnesium has the greatest degree of resistance to this phenomenon. Without being limited to theory, it is believed this is the result of a densifying of the titanium crystal lattice when the overcoated pigment is calcined. Further, the presence of phosphate appears to amplify both the anti-yellowing effect of the metal compounds and resistance to photodarkening. Accordingly, the most preferred metal compound after calcining is magnesium phosphate.

The same range of calcining temperatures can be used for the overcoating as for the hydrous titanium dioxide. It is preferably about 750° C. to about 950° C., depending on the mass of the material being calcined. More preferably, the range is about 825° C. to about 875° C. The calcining time for the overcoating can range from several minutes to several hours. Typically, 100 g of titanium dioxide-coated mica pigment can be calcined at about 850° C. for about 30 minutes to achieve optimum anti-yellowing effect and resistance to photodarkening. If a smaller quantity is used, less calcining time is needed. In general, it is only necessary to insure that the pigment reaches the calcining temperature for a short period of time.

The titanium dioxide-coated mica particles having the additional layer calcined thereon may then be combined with an anti-oxidant known to promote yellowing in the presence of titanium dioxide-coated mica and polyolefin to form a composition. The resulting products of the present invention can then be used in the conventional fashion.

A wide variety of polyolefins are well known in the art and are suitable for being used with the coated titanium dioxide-coated mica pigments of this invention. Illustrative of such polyolefins are the following: polyethylene, polypropylene, polybutadiene, and the like. The foregoing list is merely for illustration and not by way of limitation.

Conventional anti-oxidants typically used in polyolefin compositions include, for example, alkylated phenols, substituted benzophenones, thiobisphenols, polyphenols, and the like and mixtures thereof. Exemplary antioxidants include 2,6-di-tertiary-butyl-para-cresol, 2,2'-methylenebis (4-methyl-6-tertiary-butylphenol), 4,4'-methylenebis (2,6-di-tertiary-butylphenol), 4,4'-thiobis (6-tertiary-butyl-orthocresol), and the like.

A wide variety of conventional additives may also be included in the polyolefin compositions as is necessary, desirable or conventional. Such additives include catalysts, initiators, blowing agents, UV stabilizers, organic pigments including tinctorial pigments, plasticizers, leveling agents, flame retardants, anti-cratering additives, and the like.

A significant pigmentary property improvement which can be achieved by the treated titanium dioxide pigments of this invention is the suppression of yellowing in polyolefin compositions, such as, for example, polyethylene, polypropylene and the like.

In order to further illustrate the present invention, various examples are set forth below. In these examples, as well as throughout this specification and claims, all temperatures are in degrees centigrade and all parts and percentages are by weight, unless otherwise indicated.

EXAMPLE 1

100 g. of fully calcined, pearl reflecting anatase $TiO_2$-coated mica with particles having an average particle size of 10 microns, available from The Mearl Corporation as MagnaPearl 2000 were dispersed in 500 ml of distilled water and placed in a suitable vessel. The temperature was raised to 85° C. and maintained at this temperature. Stirring was maintained throughout the coating process. A solution was then added containing 3 g. of $MgCl_2.6H_2O$ in 50 ml of distilled water at a rate of 0.47 ml/min. The pH was maintained at 7.5 using a solution consisting of 5% $Na_3PO_4$. The slurry was stirred for one hour. It was then filtered on a Buchner funnel, washed adequately with distilled water to remove salts and dried overnight at 120° C. It was then calcined at 850° C. for 45 minutes. This procedure produced a coating of approximately 0.2% by weight of Mg and P on the $TiO_2$-coated mica.

EXAMPLE 2

The procedure of Example 1 was repeated using a pearl reflecting anatase $TiO_2$-coated mica having an average particle size of 25 microns and available from The Mearl Corporation as Mearlin Super White, 9020C.

EXAMPLE 3

A series of blue interference color titanium dioxide coated micas were made and an aliquot of each had its surface area ($m^2/g$) determined by the BET method after calcination. The remaining portions were immersed in aqueous solutions containing magnesium, and the pH was adjusted to about 11 with sodium hydroxide. The resulting pigment was dried and then calcined at 850° C. The amount of magnesium was varied. The surface area was determined again after the overcoating. Table 1A shows the decreasing surface area as a function of increasing magnesium concentration. Table 1B demonstrates the improved anti-yellowing properties and photostability of the same samples from Table 1A as represented by ΔE and ΔL, respectively. Improved anti-yellowing (ΔE) and photostability (ΔL) are recognized by a reduced ΔE and ΔL, respectively.

TABLE 1A

| % Mg | BET Surface Area (m²/g) without Mg | BET Surface Area (m²/g) with Mg |
| --- | --- | --- |
| 0-Control | 6.3 | — |
| 0.12 | 6.3 | 4.4 |
| 0.28 | 5.8 | 4.0 |
| 0.48 | 5.7 | 4.3 |
| 0.95 | 5.7 | 3.6 |

TABLE 1B

| % Mg | Anti-Yellowing ΔE | Photostability ΔL |
| --- | --- | --- |
| 0-Control | 35.7 | 2.4 |
| 0.12 | — | — |
| 0.28 | 14.6 | 1.1 |
| 0.48 | 26.9 | 1.4 |
| 0.95 | 10.8 | 0.9 |

Changes in appearance of a pigment were characterized by measuring the CIE L*a*b* values. This system is described in the text "The Measurement of Appearance", Second Edition, Hunter & Harold, Editors, John Wiley & Sons, 1987. Briefly this system involves measuring a lightness-darkness component designated L*, a red-green component designated a* and a yellow-blue component designated b*. The difference in color, designated De* (also designated DE or ΔE), was calculated using the equation $DE^* = [(DL^*)^2 + (Da^*)^2 + (Db^*)^2]^{1/2}$ in which DL*, Da* and Db* (also known as DL, Da and Db) represent the differences in L*, a* and b* values between the samples of pigment exposed and unexposed to ultraviolet, visible or infrared radiation. The higher the value of de*, the greater the change in appearance of the pigment comparing exposed and unexposed samples.

In addition, the photodarkening properties of the pigment were determined by measuring the difference (the "delta", designated ΔL in the accompanying tables) in coloration before and after exposure to UV radiation. A description of the test is as follows:

A solution is prepared using 1.89 g of material and enough high or medium solids automotive paint vehicle to make a total weight of 15 g. It is then drawn down on a white primed metal panel using a bar with a 0.006" cut. The panel is allowed to dry at least 5 minutes before baking at 120° C. for 30 min. A Hunter LabScan fixed geometry calorimeter is used to measure CIELab values against the white background. In a paint system, the major contributor to Delta E is due to a change in L* and changes in a* and b* are generally minor. The panel is continuously exposed to UV light (UVA-351 bulbs in a Q-U-V apparatus with no water present) for 20 hours. Only half of the white portion is exposed so that measurements can be correlated with visual observations. CIELab values are measured immediately (within 2 minutes) after the halt of exposure and periodically over the next 24 hours. They are compared with those of other samples to assure that the changes in appearance are due to the same effect. Delta L values (also known as DL or ΔL), which include the changes in L*, are obtained by comparing the post-exposure CIELab values with the pre-exposure values. Variations in Delta L with time are compared with those of other samples to determine the degree of improvement in both initial darkening and reversibility (phototropism). The thickness of the drawdown is noted to assure that differences in Delta L are due to the treatment rather than to variations in the thickness.

EXAMPLE 4

This example demonstrates that the surface area can be reduced at constant magnesium concentration and increasing calcining temperature. In addition, anti-yellowing (ΔE) and photodarkening (ΔL) properties are improved.

Example 3 was repeated using a constant amount of 0.5% Mg but varying the calcining temperature. The results are shown in Table 2.

TABLE 2

| Degrees C. | Surface Area, m²/g Without Mg | Surface Area, m²/g With Mg | ΔE | ΔL |
| --- | --- | --- | --- | --- |
| 800 | 7.3 | 4.8 | — | — |
| 850 | 6.3 | 4.3 | — | — |
| 900 | 4.3 | 3.1 | 5.88 | 0.67 |
| 950 | 4.3 | 2.2 | 5.56 | 0.50 |
| 975 | 4.4 | 1.4 | 8.81 | 0.38 |

EXAMPLE 5

This example demonstrates the utility of additivies for reducing the surface area of pearlescent pigments for improved stability.

Example 4 was repeated using other metal oxides other than magnesium oxide. When the metal was calcium at 0.4% the surface area was 4.6 m²/g and when it was zinc at the same concentration the surface area was 4.7 m²/g. The titanium dioxide before the overcoating had a surface area of 6.3 m²/g. These examples demonstrate the utility of additives for reducing the surface area of pearlescent pigments for improved stability.

EXAMPLE 6

Example 6 demonstrates applying the experimental conditions of Example 3 to different optical interference colors for improved stability. A series of titanium dioxide coated mica pearlescent pigments having different optical thicknesses, and therefore different interference colors, were overcoated with about 0.5% Mg at a pH of about 11 and calcined at a temperature in the range of 850–900° C. The color and the surface area results are shown in Table 3.

TABLE 3

| Color | Surface Area, m²/g Without Mg | Surface Area, m²/g With Mg |
| --- | --- | --- |
| pearl | 4.6 | 2.7 |
| gold | 4.6 | 3.9 |
| red | 6.9 | 4.5 |
| blue | 5.8 | 4.0 |
| green | 6.0 | 3.8 |

EXAMPLE 7

Samples of a titanium dioxide coated mica pearlescent pigment in which the titanium dioxide was in the rutile crystalline form without an overcoating and with an overcoating containing 0.46% magnesium were evaluated for their anti-yellowing properties.

Determination of the yellow index was performed by incorporating the titanium dioxide-coated mica in high density polyethylene (HDPE) step chips with an antioxidant, butylated hydroxytoluene (BHT), and exposing the step chips to UV light in a QUV meter. The yellowing which occurred was monitored by obtaining the Yellow Index as measured on a Hunter LabScan meter.

In more detail, the pigment under test was first blended at 1% concentration based on the weight of the resin with pellets of high density polyethylene (containing about 1% ACP, a low molecular wax) in a P-K (Paterson-Kelley) blender. 0.3% butylated hydroxytoluene was added and blended. The resin containing the titanium dioxide-coated mica and the BHT was then injection molded into step chips. These step chips were exposed in a QUV meter equipped with UVA-351 nm bulbs for a total of 96 hours (each cycle is 8 hours UV and 4 hours condensation exposure) and the Yellow Index was then measured on a McBeth goniospectrophotometer. The higher the Yellow Index (YI), the greater the degree of yellowing. If BHT is not used, no yellowing occurs.

The composition in which the titanium dioxide-coated mica had not been overcoated exhibited a yellow index (YI) of 21.1 whereas the composition in which the titanium dioxide had been magnesium treated had a YI of 5.9

EXAMPLE 8

A series of overcoated titanium dioxide coated mica pearlescent pigments were prepared and tested for anti-yellowing properties.

Table 4 below indicates the crystalline form of the titanium dioxide, the overcoating treatment used, the surface area of the resulting pigment and the resulting yellow index (YI). The surface area was determined using the BET method and is reported in $m^2/g$ of pigment. A lower value of YI is indicative of improved anti-yellowing. Unless otherwise indicated, the pigment coated had a particle size of $20\mu$.

TABLE 4

| $TiO_2$ Coated Mica | Post Treatment | BET ($m^2/g$) | YI |
|---|---|---|---|
| Anatase 28% $TiO_2$ | None | 6.8 | 40.11 |
| Rutile, $10\mu$ 37% $TiO_2$ | Al, Si | 6.5 | 17.7 |
| Anatase, $10\mu$ 37% $TiO_2$ | Y, Zr | 5.1 | 18.2 |
| Anatase, $10\mu$ 37% $TiO_2$ | 0.25% Zn, 0.25% P | 3.5 | 13.74 |
| Anatase 28% $TiO_2$ | 1% Y | 3.5 | 4.04 |
| Anatase 28% $TiO_2$ | 2.0% Zr, 0.25% Y | 5.4 | 25.7 |
| Anatase 28% $TiO_2$ | 1% Zr, 0.25% Y | 4.7 | 20.9 |
| Anatase 28% $TiO_2$ | 1.5% Y | 4.2 | 10.4 |
| Rutile 28% $TiO_2$ | 1.5% Y | 3.3 | 6.4 |
| Anatase 28% $TiO_2$ | 1.5% Ce | 6.7 | 25.7 |
| Anatase, $10\mu$ 37% $TiO_2$ | None | 7.4 | 23.5 |
| Anatase, $10\mu$ 37% $TiO_2$ | 0.7% Mg 0.5% P | 4.3 | 12.8 |

TABLE 4-continued

| $TiO_2$ Coated Mica | Post Treatment | BET ($m^2/g$) | YI |
|---|---|---|---|
| Anatase, $10\mu$ 37% $TiO_2$ | 0.5% Ca 0.5% P | 7.1 | 18.4 |

EXAMPLE 9

A series of $20\mu$ particle size overcoated titanium dioxide coated mica pearlescent pigments in which the titanium dioxide coating was sufficiently thick to exhibit an interference color were prepared with calcium and magnesium phosphorous compounds and tested for anti-yellowing properties. A reduced $\Delta E$ is indicative of improved anti-yellowing and color stability in high density polypropylene. The results are shown in Table 5.

TABLE 5

| $TiO_2$ Coated Mica | Interference Color | Post Treatment | BET ($m^2/g$) | $\Delta E$ |
|---|---|---|---|---|
| Rutile, $20\mu$ 38–44% $TiO_2$ | gold | none | 5.8 | 16.4 |
| Rutile, $20\mu$ 38–44% $TiO_2$ | gold | Mg, P | 6.5 | 6.9 |
| Rutile, $20\mu$ 48–56% $TiO_2$ | gold | Ca, P | 6.3 | 6.2 |
| Rutile, $20\mu$ 48–56% $TiO_2$ | blue | none | 6.8 | 11.1 |
| Rutile, $20\mu$ 48–56% $TiO_2$ | blue | Mg, P | 4.4 | 5.3 |
| Rutile, $20\mu$ 48–56% $TiO_2$ | blue | Ca, P | 6.0 | 8.1 |
| Rutile, $20\mu$ 53–60% $TiO_2$ | green | none | 6.9 | 14.0 |
| Rutile, $20\mu$ 53–60% $TiO_2$ | green | Ca, P | 10.4 | 12.4 |

EXAMPLE 10

A titanium dioxide coated mica pigment was compared to the same pigment having a phosphorous treatment and a magnesium phosphorous compound treatment. A reduced $\Delta E$ is indicative of improved anti-yellowing and color stability in high density polypropylene. The results are set forth in Table 6.

TABLE 6

| $TiO_2$ Coated Mica | Color | Post Treatment | BET ($m_2/g$) | $\Delta E$ |
|---|---|---|---|---|
| Rutile, $20\mu$ 48–56%, $TiO_2$ | Blue | none | 6.8 | 11.1 |
| Rutile, $20\mu$ 48–56%, $TiO_2$ | Blue | P | 7.3 | 13.1 |
| Rutile, $20\mu$ 48–56%, $TiO_2$ | Blue | Mg, P | 4.4 | 5.3 |

EXAMPLE 11

Treatments of titanium dioxide coated mica pearlescent pigments having different optical thicknesses were carried out. A reduced $\Delta E$ is indicative of improved anti-yellowing and color stability in high density polypropylene. The results are shown in Table 7 below.

TABLE 7

| TiO$_2$ Coated Mica | Interference Color | Post Treatment | BET (m$^2$/g) | ΔE | Comments |
|---|---|---|---|---|---|
| Rutile, 20μ 38–44%, TiO$_2$ | Gold | None | 5.8 | 16.4 | control |
| Rutile, 20μ 38–44%, TiO$_2$ | Gold | Mg, P | 6.5 | 6.9 | ≈0.2% Mg & P |
| Rutile, 20μ 38–44%, TiO$_2$ | Gold | Ca, P | 6.3 | 6.2 | ≈0.2% Ca, ≈0.2% P |
| Rutile, 20μ 48–56%, TiO$_2$ | Blue | None | 6.8 | 11.1 | control |
| Rutile, 20μ 48–56%, TiO$_2$ | Blue | Mg, P | 4.4 | 5.3 | ≈0.3% Mg & P |
| Rutile, 20μ 48–56%, TiO$_2$ | Blue | Ca, P | 6.0 | 8.1 | ≈0.5% Ca & .3% P |
| Rutile, 20μ 53–60%, TiO$_2$ | Green | None | 6.9 | 14.0 | control |
| Rutile, 20μ 53–60%, TiO$_2$ | Green | Ca, P | 10.4 | 12.4 | ≈0.5% Ca & 0.3% P |

Although the present invention has been described in relation to particular embodiments thereof, many other variations and modifications and other uses will become apparent to those skilled in the art.

What is claimed is:

1. A composition comprising:
   a polyolefin;
   an antioxidant; and
   a pearlescent pigment comprising mica particles having on a surface thereof a first layer of a coating of titanium dioxide and a second layer thereon of a coating of calcined metal compound selected from the group consisting of (a) the oxides and phosphorous compounds of Mg, Ca, Ce, Zn and Y and (b) doped ZrO$_2$ in which the dopant is Y, Ca or Ce.

2. A composition according to claim 1, wherein the antioxidant is butylated hydroxytoluene.

3. A composition according to claim 1, wherein the polyolefin is polyethylene or polypropylene.

4. A composition according to claim 1, wherein the coating of calcined metal compound contains about 0.1 to 5% metal.

5. A composition according to claim 1, wherein the coating of calcined metal compound contains about 0.2 to 2.5% metal.

6. A composition according to claim 1, wherein the second layer contains Mg.

7. A composition according to claim 6, wherein the second layer contains phosphate.

8. A composition according to claim 1, wherein the second layer contains at least one of Zn, Ca and Y.

9. A composition according to claim 8, wherein the second layer contains phosphate.

10. A composition according to claim 1, wherein the second layer contains phosphate.

11. An antioxidant containing composition comprising, in addition to the antioxidant, a pearlescent pigment comprising mica particles having on a surface thereof a first layer of a coating of titanium dioxide and a second layer thereon of a coating of calcined metal compound selected from the group consisting of (a) the oxides and phosphorous compounds of Mg, Ca, Ce, Zn and Y and (b) doped ZrO$_2$ in which the dopant is Y, Ca or Ce.

12. A composition according to claim 11, wherein the coating of calcined metal compound contains about 0.1 to 5% metal.

13. A composition according to claim 12, wherein the coating of calcined metal compound contains about 0.2 to 2.5% of the metal.

14. A composition according to claim 11, wherein the second layer contains Mg.

15. A composition according to claim 14, wherein the second layer contains phosphate.

16. A composition according to claim 11, wherein the second layer contains at least one of Zn, Ca and Y.

17. A composition according to claim 16, wherein the second layer contains phosphate.

18. A composition according to claim 11, wherein the second layer contains phosphate.

19. A micaceous pigment having improved anti-yellowing or photodarkening properties, the pigment comprising mica particles having on a surface thereof a first layer of a coating of titanium dioxide and a second layer thereon of a coating of calcined metal compound selected from the group consisting of (a) the oxides of Mg, Ca and Y, (b) the phosphorous compounds of Mg, Ca, Ce and Y, (c) doped ZrO$_2$ in which the dopant is Y, Ca or Ce, and (d) zinc phosphate.

20. A pigment according to claim 19, wherein the coating of calcined metal compound contains about 0.1 to 5% metal.

21. A composition according to claim 20, wherein the coating of calcined metal compound contains about 0.2 to 2.5% metal.

22. A composition according to claim 19, wherein the second layer contains Mg.

23. A composition according to claim 22, wherein the second layer contains phosphate.

24. A composition according to claim 19, wherein the second layer contains at least one of Zn, Ca and Y.

25. A composition according to claim 19, wherein the second layer contains phosphate.

26. A process for preventing the yellowing of an antioxidant containing polyolefin composition, which comprises incorporating in said composition mica particles having on a surface thereof a first layer of a coating of titanium dioxide and a second layer of a coating of metal compound selected from the group consisting of (a) the oxides and phosphorous compounds of Mg, Ca, Ce, Zn and Y and (b) doped ZrO$_2$ in which the dopant is Y, Ca or Ce.

27. The process according to claim 26, wherein the second layer contains Mg.

28. The process according to claim 26, wherein the second layer contains at least one of Zn, Ca and Y.

29. A process for retarding the photodarkening properties of a titanium dioxide-coated mica pearlescent pigment which comprises forming on the titanium dioxide-coated mica a layer of a coating of calcined metal compound selected from the group consisting of (a) the oxides of Mg, Ca and Y, (b) the phosphorous compounds of Mg, Ca, Ce, Zn and Y, and (c) doped $ZrO_2$ in which the dopant is Y, Ca or Ce.

30. A process according to claim 29, wherein the second layer contains Mg.

31. A process according to claim 29, wherein the second layer contains at least one of Zn, Ca and Y.

32. A process according to claim 29, wherein the second layer contains phosphate.

* * * * *